D. C. McMILLION.
COMBINED TIRE VALVE AND PRESSURE GOVERNOR.
APPLICATION FILED JULY 8, 1912.
1,053,623.
Patented Feb. 18, 1913.
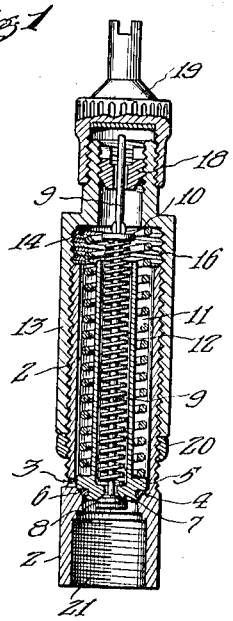
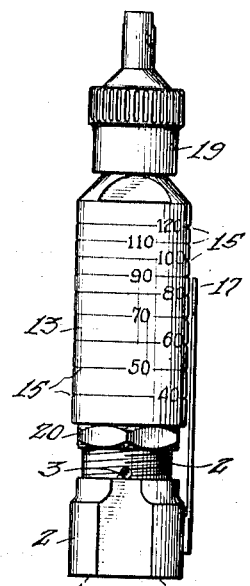
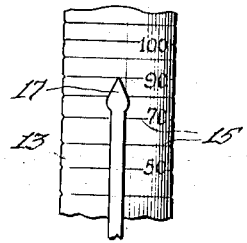
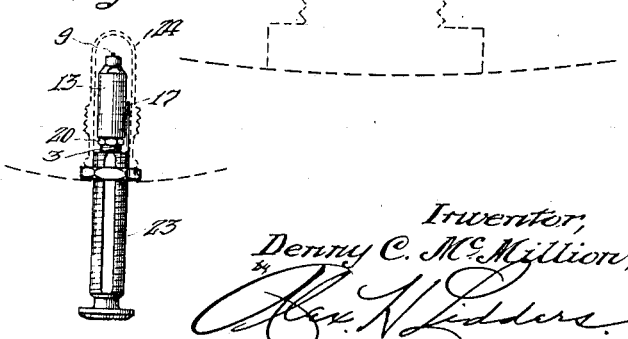
Witnesses:
Inventor,
Denny C. McMillion;
His Attorney.

UNITED STATES PATENT OFFICE.

DENNY C. McMILLION, OF LOS ANGELES, CALIFORNIA.

COMBINED TIRE-VALVE AND PRESSURE-GOVERNOR.

1,053,623. Specification of Letters Patent. Patented Feb. 18, 1913.

Application filed July 8, 1912. Serial No. 708,391.

*To all whom it may concern:*

Be it known that I, DENNY C. McMILLION, a citizen of the United States of America, residing at Los Angeles, in the county of Los Angeles, State of California, have invented a certain new and useful Combined Tire-Valve and Pressure-Governor; and I do hereby declare the following to be a full, clear, and exact description of the invention, such as will enable others skilled in the art to which it appertains to make and use the same.

This invention relates to combined tire valve and pressure governor, and it may be said to consist in the provision of the novel features and in the novel and improved construction, arrangement and combination of parts and members as will be apparent from the description and claim which follow hereinafter.

One object of the invention is to provide a novel and improved device of the character specified which may readily be applied to valve tubes already in use on vehicle tires.

Further objects are to provide a novel and improved device of the character specified which is simple and compact in construction, economical to manufacture, strong and durable, of comparatively small size, neat in appearance, easily adjustable, convenient in use, and effective in action.

Other objects and the advantages of the invention will be apparent to those skilled in the art from a consideration of the following description of the preferred forms of construction embodying the invention, taken in connection with the accompanying drawings in which—

Figure 1 is a sectional view of the device adapted to be screwed on the upper end portion of a valve tube now in use on vehicle tires; Fig. 2 is a view of the device applied to a valve tube; Fig. 3 is a fragmentary view of the graduated member and pointer, and Fig. 4 is an elevation of the device provided with an extension whereby it may be applied to a vehicle tire instead of to a valve tube already on the tire.

The hollow member 2 is provided with a vent 3 and with a valve seat 4 therein below the vent. A valve 5, preferably provided with a packing ring 6 of suitable material, is adapted to fit into the valve seat 4 and is provided with a valve seat 7 for the valve 8 which has thereon the stem 9 which passes through the valve 5 and has thereon the collar 10. The valve 5 may have thereon the upwardly extending tubular part 11 and a spring 12 may be arranged in the part 11 and have its ends in engagement with the collar 10 and the valve 5. A hollow member 13 having graduations 15 thereon and having the upper part thereof of reduced size and threaded in the interior and on the exterior thereof, is adjustably mounted on the hollow member 2 preferably by being threaded on its interior and thereby adapted to be screwed up or down on the threaded exterior of the hollow member 2. The valve 5 is pressed by a spring 16 which surrounds the spring 12 and has its ends in engagement with the valve 5 and the shoulder 14 in the hollow member 13; the tension of the spring 16 being adjustable by adjusting the hollow member 13 on the hollow member 2. A suitable pointer 17 may have the lower part thereof affixed to the hollow member 2 and have its upper part suitably disposed adjacent to the graduations 15. In the upper 80 part of the hollow member 13 may be screwed the plug 18 through which the upper part of the stem 9 may pass, and a cap 19 may be screwed on the upper part of the hollow member 13. A nut 20 may be provided on the hollow member 2 to hold the hollow member 13 in adjusted position thereon. The hollow member 2 may be provided with an interiorly threaded lower part 21 whereby the device may be screwed on the usual valve tube indicated by 22, Fig. 2, or it may be provided with a suitable extension 23, see Fig. 4, whereby the device may be applied to a vehicle tire instead of to a valve tube already on the tire. In the form of the device shown in Fig. 4, a cap indicated by 24 may be screwed on the extension 23.

In use, the hollow member 13 may be turned to move it on the hollow member 2 to bring opposite to the end of the pointer 17 that one of the graduations 15 which denotes the desired or safe pressure for air for the tire to which the device is applied. Air under pressure may then be supplied to the tire through the valve 8 by removing the cap 19 or 24 and attaching the usual air hose or the like to the upper part of the hollow member 13, and, when the desired or safe pressure of the air in the tire is exceeded the valve 5 is moved upwardly against the pressure of the spring 16 and air escapes from the vent 3 until the desired or safe pressure of the air in the tire is reached, whereupon the valve 5 is moved back to its seat. It will be seen that if, due to heat or other cause, the pressure of the air in the tire becomes excessive, the valve 5 automatically operates to bring the pressure of the air down to that indicated by the pointer 17.

While forms of construction embodying the invention have been particularly illustrated and described, many changes and modifications thereof will readily occur to those skilled in the art, wherefore, the right is reserved to all such changes and modifications as do not depart from the spirit and scope of the invention as defined in the appended claim.

I claim:

A combined tire valve and pressure governor, comprising a hollow member having the lower part thereof formed to screw on a valve tube and provided with a vent and a valve seat below said vent, a second hollow member adjustably mounted on the exterior of the first hollow member and having the upper part thereof of reduced size and threaded in its interior and on its exterior, said second hollow member provided with a shoulder therein and having graduations thereon, a plug adapted to screw in the upper part of the second hollow member, a valve adapted to fit into said valve seat and provided with a valve seat and having an upwardly extending tubular part thereon, a spring having the ends thereof in engagement with said valve and said shoulder, a valve adapted to seat on the last valve seat, a stem on the last valve passing through the first valve and the plug, a collar on the stem, a spring arranged within the tubular part and having the ends thereof in engagement with the first valve and the collar, a cap adapted to screw on the upper part of the second hollow member, and a pointer having the lower end portion thereof affixed to the first hollow member and having the upper end portion thereof disposed adjacent to the graduations on the second hollow member, substantially as set forth.

In testimony whereof, I have signed my name to this specification in the presence of two subscribing witnesses at Los Angeles, county of Los Angeles, State of California, this 28th day of June A. D. 1912.

DENNY C. McMILLION.

Witnesses:
ANNA B. DESSAU,
ALEX. H. LIDDERS.